March 21, 1950 — T. MIYAGI — 2,501,533
SUGAR CANE HARVESTING MACHINE
Filed Feb. 3, 1949 — 6 Sheets-Sheet 1
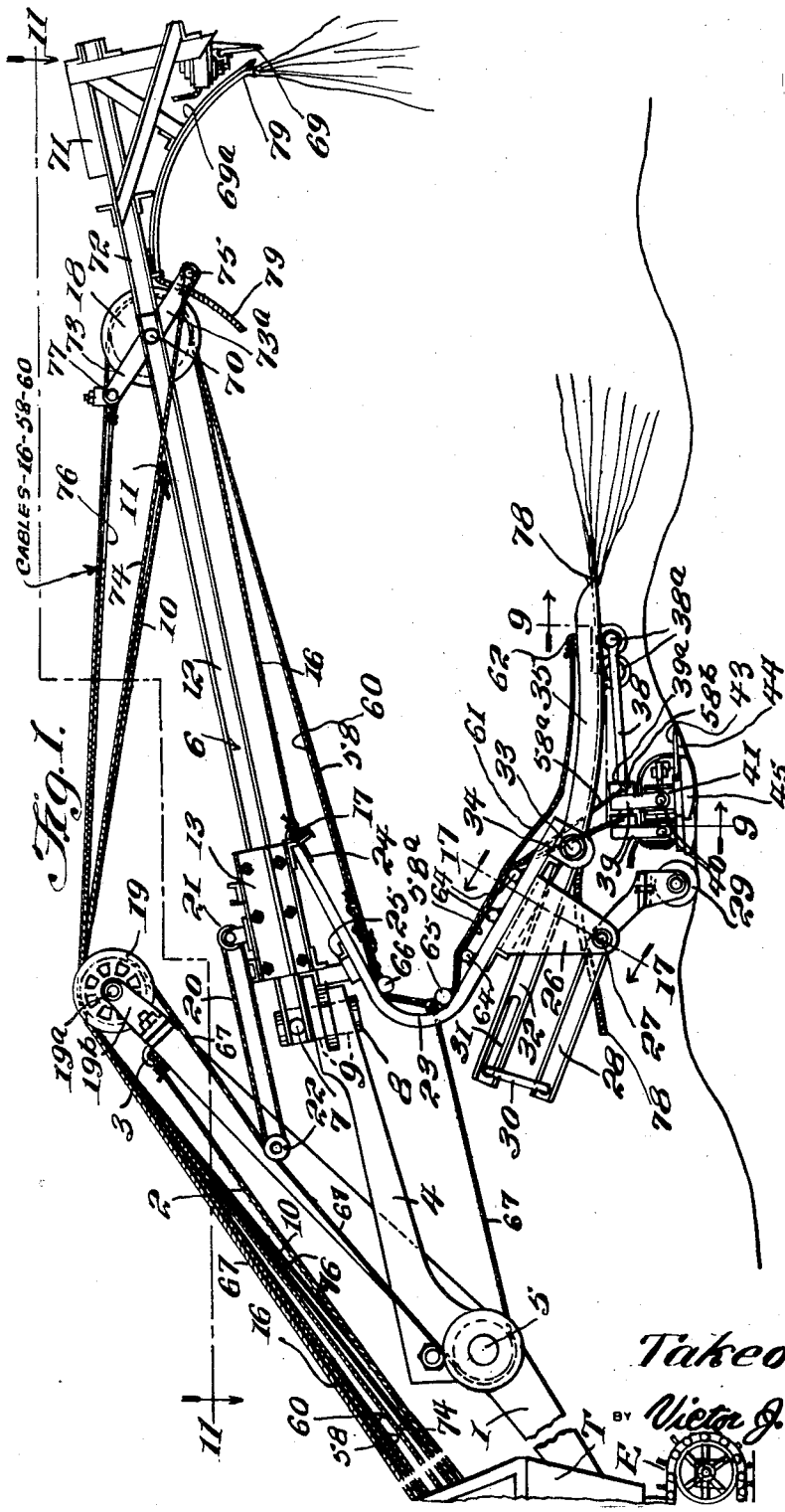
INVENTOR.
Takeo Miyagi,
BY Victor J. Evans & Co.
ATTORNEYS March 21, 1950        T. MIYAGI        2,501,533
SUGAR CANE HARVESTING MACHINE
Filed Feb. 3, 1949        6 Sheets-Sheet 2
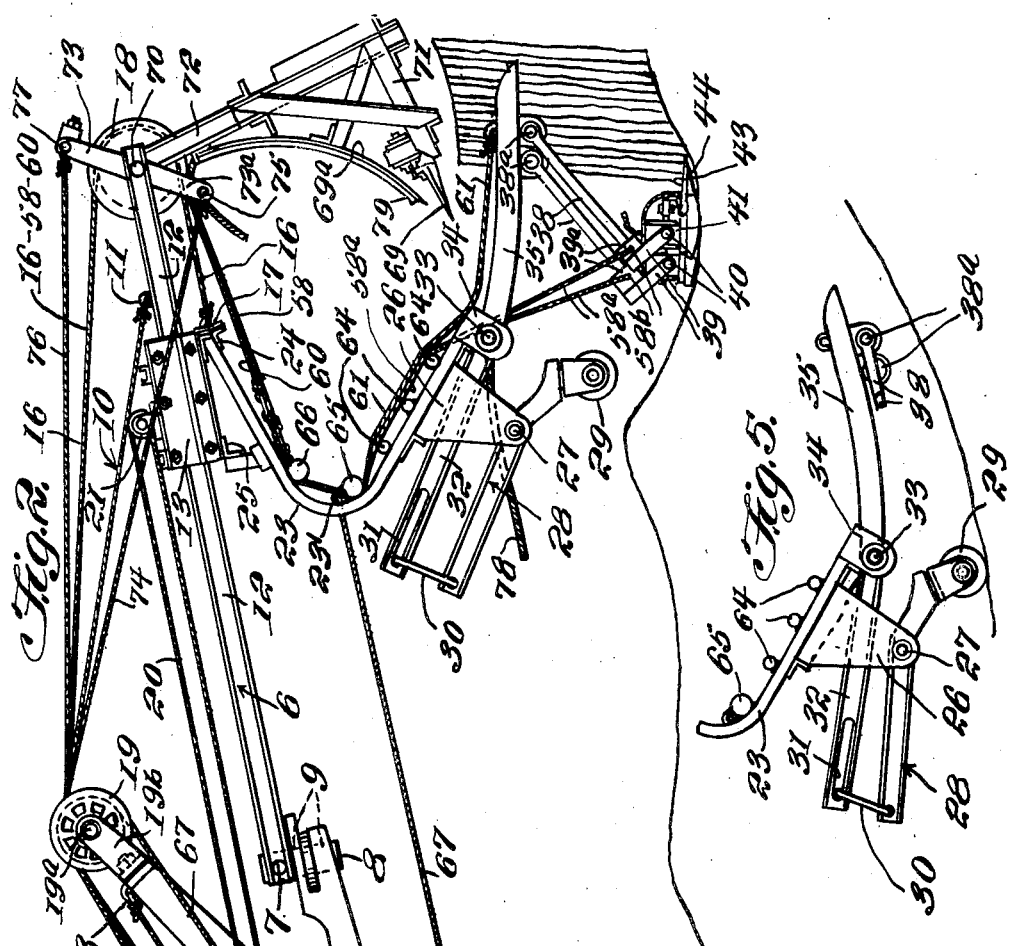

March 21, 1950  T. MIYAGI  2,501,533
SUGAR CANE HARVESTING MACHINE
Filed Feb. 3, 1949  6 Sheets-Sheet 3

INVENTOR.
Takeo Miyagi,
BY Victor J. Evans & Co.
ATTORNEYS

March 21, 1950 T. MIYAGI 2,501,533
SUGAR CANE HARVESTING MACHINE
Filed Feb. 3, 1949 6 Sheets—Sheet 4
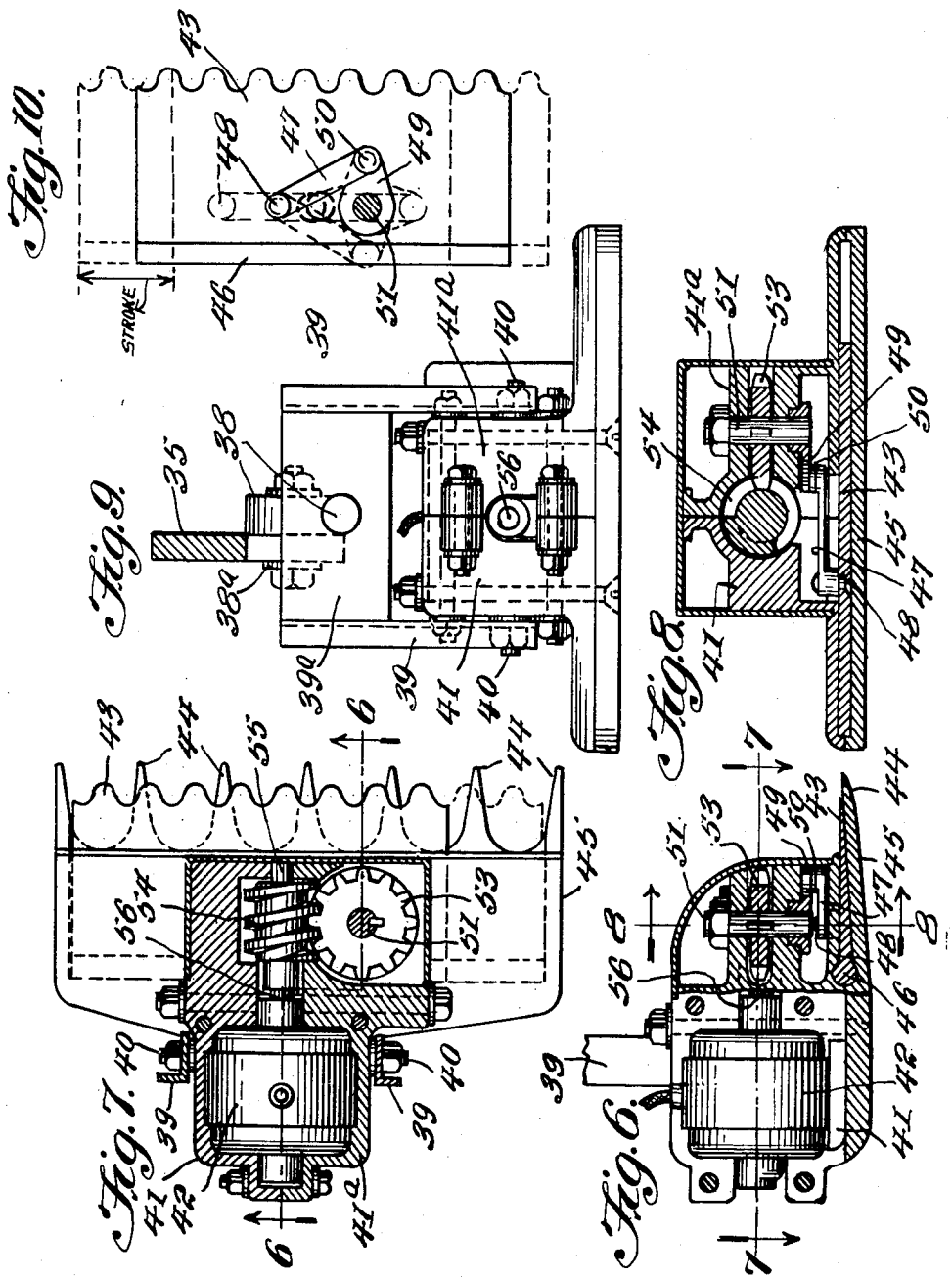
INVENTOR.
Takeo Miyagi,
BY Victor J. Evans & Co.
ATTORNEYS March 21, 1950 T. MIYAGI 2,501,533
SUGAR CANE HARVESTING MACHINE
Filed Feb. 3, 1949 6 Sheets-Sheet 5
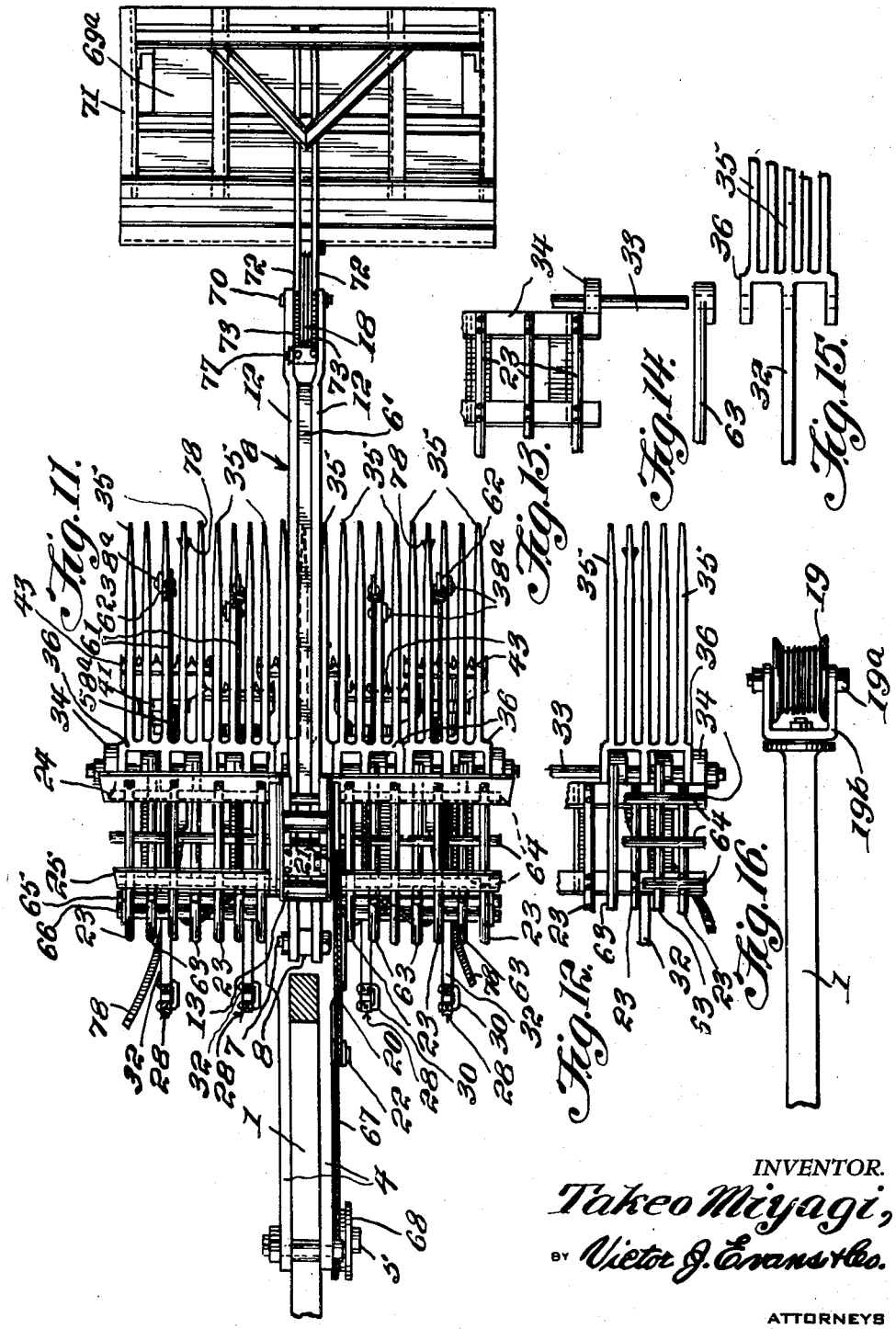
INVENTOR.
Takeo Miyagi,
BY Victor J. Evans & Co.
ATTORNEYS

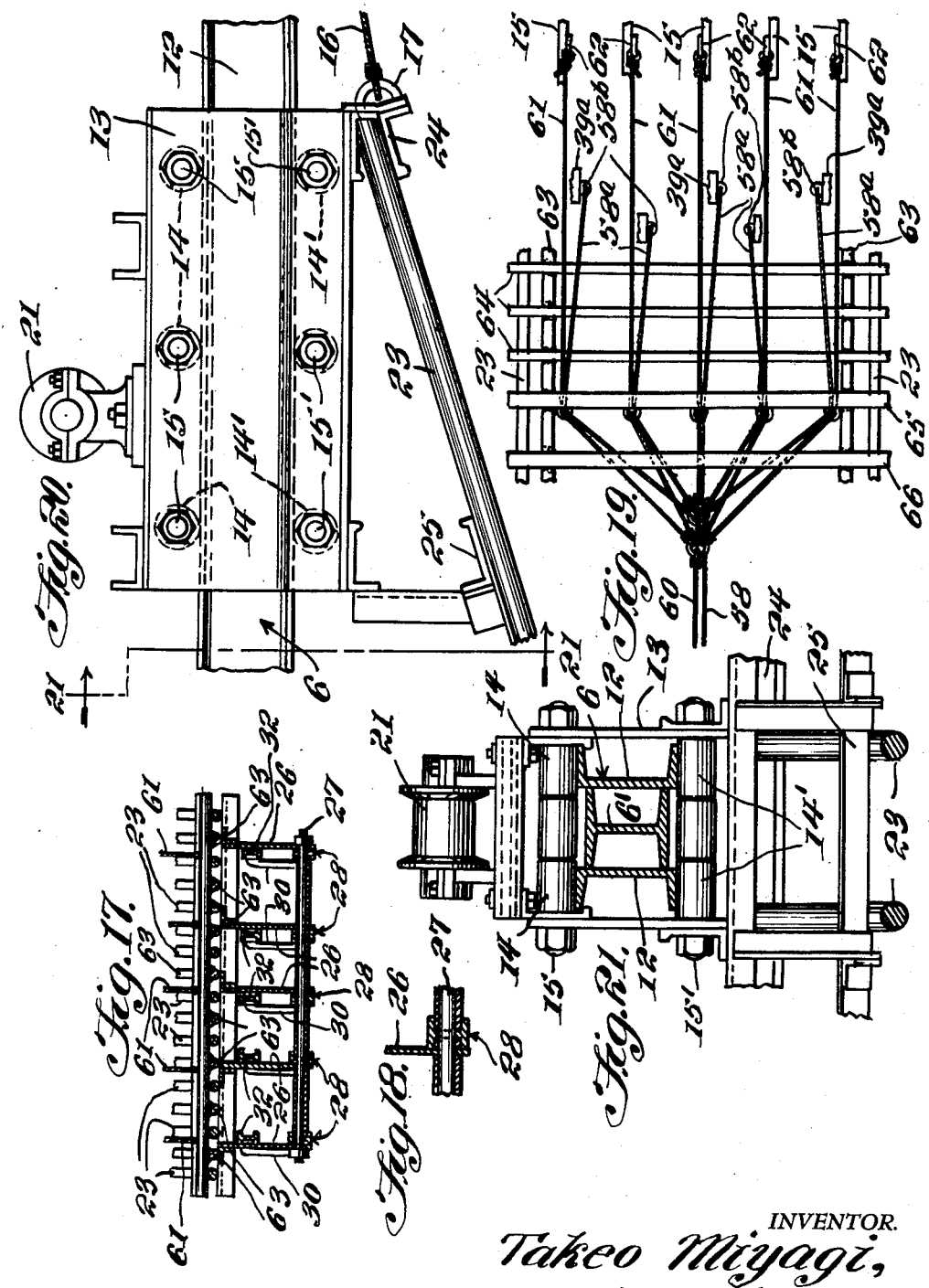

Patented Mar. 21, 1950

2,501,533

UNITED STATES PATENT OFFICE 2,501,533

SUGAR-CANE HARVESTING MACHINE

Takeo Miyagi, Waipahu, Territory of Hawaii

Application February 3, 1949, Serial No. 74,327

14 Claims. (Cl. 56—15)

1

The present invention relates to the general class of harvesters, and more particularly to improvements in sugar cane harvesters of the tractor propelled type especially designed for efficient work in the cane fields having uneven or irregular ground surfaces. For this purpose the tractor, or automotive vehicle, is equipped with a crane swiveled on an upright axis and adapted to swing in a vertical plane on a horizontal axis, upon which crane are carried and suspended various devices and appliances for harvesting a standing crop without injury to the roots, thus leaving the field in condition to grow a succeeding crop of sugar cane. In a harvesting operation in the field the standing cane is cut, the cut cane is gathered in horizontally extending piles or bundles, a second cutting mechanism clips or severs the leaves and tops from the cut cane, and then the bundled cane is conveyed to and deposited upon harvesting trucks or carriers for hauling to the factory. Suitable operating appliances, power transmitting mechanism, cable hoists, and manually operated control mechanisms, are provided and utilized by one or more operators stationed on the automotive vehicle in carrying out the successive harvesting steps.

For optional use, means are provided for burning the trash before and during the harvesting operations, and for this purpose flame throwers or torches may be mounted on desirable portions of the equipment for disposing of the trash without injury to the harvested crop.

The invention consists in certain novel features of construction, and combinations and arrangements of parts as will hereinafter be described and more specifically set forth in the appended claims.

In the accompanying drawings I have illustrated a complete example of a physical embodiment of my invention wherein the parts are combined and arranged in accord with one mode I have devised for the practical application of the principles of my invention. It will however be understood that changes and alterations are contemplated and may be made in these exemplifying drawings and structures, within the scope of my claims, without departing from the principles of the invention.

Figure 1 is a view in side elevation, showing a portion of a tractor equipped with the harvesting mechanism operating upon furrowed soil, and indicating the flame throwers or torches for burning trash. Figure 2 is a view similar to Fig. 1, with the main cutter in operative position and with the bundling mechanism associated therewith. Figure 3 is a detail view of cable operating mechanism for the carriage.

Figure 5 is a detail side view of the traction truck and gathering forks or tines.

Figure 6 is a vertical sectional view at line 6—6 of Fig. 7 through the motor operated main cane cutter; and Figure 7 is a horizontal sectional view at line 7—7 of Fig. 6.

Figure 8 is a transverse vertical sectional view at line 8—8 of Fig. 6. Figure 9 is a sectional view at line 9—9 of Fig. 1 showing the rear of the motor operated main cutter.

Figure 10 is a plan view of the horizontally disposed reciprocating main cutter and its linkage.

Figure 11 is a sectional view at line 11—11 of Fig. 1.

Figure 12 is a fragmentary plan view of the gathering cradle for the cane. Figure 13, Figure 14, and Figure 15 show details of construction of the cradle and gathering forks or tines.

Figure 16 is a detail view of the seven-way pulley mounted on the free end of the crane.

Figure 17 is a detail sectional view at line 17—17 of Fig. 1; and Figure 18 is a detail sectional view thereof.

Figure 19 is a diagrammatic plan view of the gathering tines and conveying cradle.

Figure 20 is an enlarged side elevation of the carriage; and Figure 21 is a vertical sectional view at line 21—21 of Fig. 20.

Figure 4:
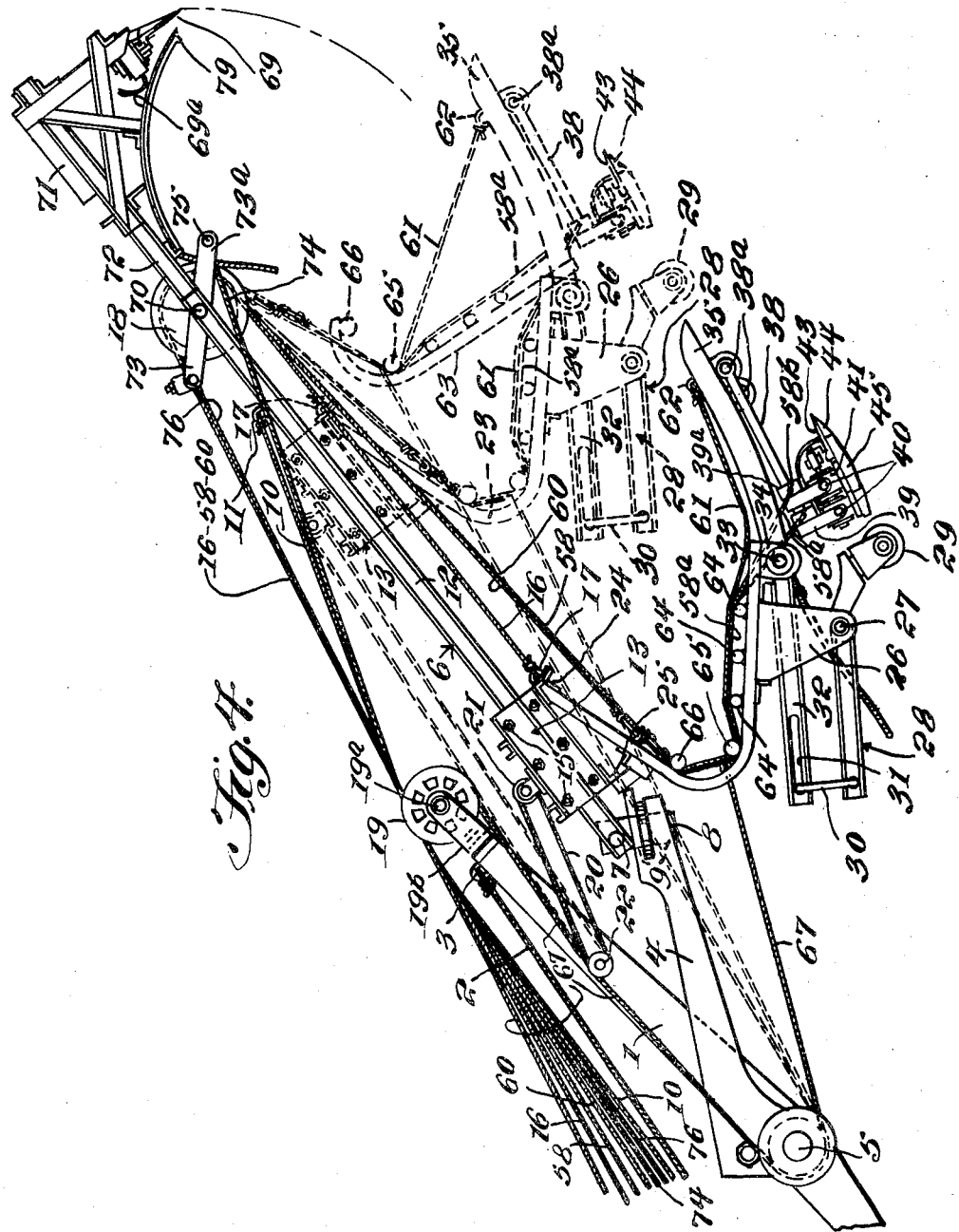
Figure 4 is a side view of the crane carried parts, showing by dotted lines different positions of the bundling and dumping mechanisms.

In order that the general arrangement and utility of parts may readily be understood, I have shown in Figs. 1 and 3 the front portion of a tractor T having endless chain treads E for steering by driving along the furrows of the cane field. The tractor, or other automotive vehicle is equipped with a front open-work boom 1 hinged upon the deck of the tractor, and a hoisting cable 2 is attached at 3 to the boom and the crane is provided with the usual windlass mechanism (not shown) for swinging the boom in a vertical plane for adjustment of the harvester attachment and for moving the attachment to inoperative position for transportation purposes.

Near the inner pivot end of the boom a two-arm yoke 4 is mounted by a pin 5 and on the forward end of the yoke a fabricated beam 6 is mounted at the point 7 upon an upright pin 8 that is held at 9 in the front end of the yoke. The yoke and the beam are bodily movable with the crane, and in addition the yoke and its beam are vertically adjustable with the boom by means of a cable 10 attached at 11 near the outer free end of the beam, and the cable 10 is manually operated by suitable control means on the crane.

As shown in detail in Fig. 21 the beam 6 is fabricated with a pair of oppositely arranged and latterally positioned channel plates 12, 12, that are rigidly united, as by welding at the opposite sides of the I-shaped core 6', and the upper and lower flanges of these channel plates form guide rails or tracks for a reciprocating carriage 13 that is equipped with bearing rollers 14 and 14' journaled on transverse bolts 15 and 15', and adapted to roll on the tracks.

The reciprocable carriage, from which the harvesting mechanism is suspended, is pulled forward on the tracks toward the free or outer end of the beam by means of a cable 16 attached at 17 to the carriage, and the cable passes forwardly under and upwardly around one of the sheaves 18, journaled in the free end of the beam, thence rearwardly over one of the multiple pulleys 19 journaled at 19a in a swivel head 19b on the end of boom 1, and from which the cable 16 extends to suitable rotary mechanism located on the tractor and manually controlled therein.

For the carriage a variable compensating loop 20 is formed in a retracting cable 67 (to be described hereinafter) which loop is anchored on pulley 21 of the carriage at one end and on a complementary pulley 22 journaled on the boom. From pulley 22 the retracting cable 67 passes to and extends around one of the multi-pulleys 19, and thence to the crane; and by joint control of the pulling cable 16 and the retracting cable 67, the carriage may be reciprocated on the beam, as well as retained in stationary position for harvesting operations as will be described.

The cable 67, therefore, extends from the crane on the tractor, over one of the pulleys 19, back around one of the pulleys 22, around the pulley 21, on the carriage 13, back over another of the pulleys 22, around a pulley 68 on the pin 5, and outwardly to the bars 23 where it is attached to the bar 65.

For suspending and supporting the harvesting mechanism from the carriage, in the various harvesting steps, a carrier frame of approximate U-shape in cross section and triangular-shape in elevation in the form of a cage is mounted beneath the carriage and made up of a series of laterally spaced and parallel tubular bars 23, rigidly attached at 24 and 25 to the under frame of the carriage, and this rigidly mounted carrier is movable with the carriage.

Beneath the lower portion of the carrier frame is pivotally supported a wheeled truck adapted to form a flexible support as the harvesting mechanism passes over furrows or irregular ground surfaces, and for this purpose a series of depending bearing plates 26 are rigidly attached to the bars 23 of the cage or carrier frame, and a bearing bar or journal 27 is passed transversely through the spaced bearing plates upon which the pilot truck 28 is pivotally mounted. The pilot truck includes longitudinally extending laterally spaced members having front angular ends upon which traction or supporting wheels 29 are journaled in swivel mounts, and as indicated in the drawings the pilot truck may alternately skip and roll over irregularities encountered on the ground surface.

In addition to the pivot mount 27 for the truck, the rear ends of the members 28 are flexibly connected by links 30 to the rear slotted ends 31 of laterally spaced lever arms 32, the front ends of which are journaled on the cross bar 33 that is suspended in brackets 34 from the bars 23 of the carrier frame in order that the truck may pivotally adapt itself to the irregularities in the ground surface, and also be limited in its movement with relation to the carrier frame.

For gathering the standing cane and guiding or feeding the cane in standing position to the primary or main cutter, a horizontally disposed series, of forks 35 with multiple tines projects from the front of the harvesting mechanism, and these forks are each provided with hubs 36 mounted on the cross bar 33, and fork-arms 32 projecting rearwardly from the hubs, and located beneath the carrier frame 23.

The hubs 36 are formed as illustrated in Figures 11 and 15 with the arms 32 providing centrally disposed tongues, with lugs at the ends, and with the tines 35 extended from the forward sides.

As the tines or forks of the gathering frame or gatherer 35 advance along the field the forks pass along the standing cane, and in standing position the cane is cut near the roots, and for this purpose a plurality of cutters of the sickle type are horizontally mounted beneath the gathering forks.

The sickle type cutters are coupled by means of draw bars 38 and pivotal connections 38a to the forward part of the gathering frame, and the rear ends of the draw bars are anchored in blocks 39a of angular yokes 39. The arms of the yokes are pivotally attached by pins 40 to the sections 41 and 41a of the casings of electric motors 42 which have suitable flexible connections to a source of electric power.

The motor operated cutters glide over the surface of the ground being raised and lowered by the wheels 29 through the trucks 28 and arms 32 as the cutters pass over uneven terrain, whereby the cutters will remain comparatively close to the ground when in cutting position, as indicated in Figs. 1 and 3. The sickle type cutters include horizontally reciprocating cutters or serrated knife blades 43 that coact with stationary sickle teeth 44 projecting from the front of and integral with the bases 45 of the motor casings.

For operating the reciprocating knives, which are provided with rear cross heads 46 that are slidable with the cutters in the base frames 45, motion and power are imparted to the cutters through cranks and lever mechanisms including pitmans 47 pivotally mounted at 48 on the cutters, and crank arms 49 pivoted to the pitmans at 50.

The crank arms 49 are rigidly mounted upon the lower ends of shafts 51 journaled in the section 41a of the casing which are rigidly mounted upon the motor casings and enclosed by covers 52, and the shafts are rotated through worm gears 53 keyed to the shafts for translating the rotary movement of the operating means to the reciprocating movement of the cutters. The worm gears are actuated or turned through the instrumentality of worms 54 on shafts 55, and the worm shafts are coupled in suitable manner to the shafts 56 of the motors.

The pivotally suspended sickle cutters may be adjusted to various working positions, upon coupling joints 38a by means of a hoisting cable 58 that passes around one of the multi-sheaves 18 and pulleys 19, and thence to the control station on the tractor, and the front end of this cable terminates in out spreading branches 58a that are attached at 58b to the yokes 39 for adjusting the cutters.

The cane-gathering fork is also provided with a suspension cable 60 terminating in outspreading branches 61 that are attached at 62 to the tines of the fork, for adjusting it to the crop to be harvested; and this cable also passes around the multi-pulleys 19 to rotary operating means on the tractor.

As the standing cane is cut by the sickle, the cut cane falls against and upon a combined bundle former and rack located to the rear of the gathering forks, and pivotally mounted by means of bearing hubs upon the journal bar 33, for coaction with the carrier frame in supporting the bundle being formed.

The rack includes a number of laterally spaced and parallel bars 63 that are shaped to correspond with the lower sections of the bars 23 between which they are positioned and these are united, as by welding, with spaced cross bars 64, and two larger cross bars 65 and 66 are attached under the upper curved or crook sections of the bars of the rack. The lower ends of the bars 63 are pivotally mounted on the cross rods 33 as shown in Figure 11. This open work rack is arranged to fit snugly within the carrier frame while in retracted position to receive and retain the cane as it is cut, and when this piled or stacked cane forms a bundle of desired or ample size, the loaded rack is projected from the carrier frame with the cane in position, the leaves and tops have been burned off or clipped from the cane.

The cable 60 is attached to the cross bar 66 in such manner that a pull on the cable will cause the rack to swing on its pivot 33, forwardly and thereby dump the bundle from the forks.

The retracting cable 67 is attached to the tubular bar 65 of the rack, and this cable, after passing around a rear guide pulley 68 journaled on the crane, extends therefrom to the variable compensating loop 20 on the carriage, thence over one of the multi-pulleys 19 to the actuating mechanism of the tractor. By the joint control of the pulling cable and the retracting cable the carriage and the carrier frame 23 may be reciprocated on the carriage and the carrier frame 23 may be reciprocated on the beam, as well as retained in stationary position.

For the standing cane ahead of the cutters 43, a second set of self-contained, and motor-operated cutters of the sickle type, similar to the cutters 43, are shown at 69 and these are pivotally suspended from the shaft 70 of the multi-sheave 18 on the outer end of the beam 6. This second group of cutters are rigidly mounted upon an angular frame 71, and positioned transversely of the bundle of cane, and the side bars 72 of the frame are pivotally mounted or suspended on the shaft 70.

This cutter frame is provided with cross arms 73, and 73a integral with the side bars 72 of the frame, and the control cables for the frame and cutter, are attached to the arms. A cable 74 is attached at 75 to the cross arm 73a for swinging the frame and cutters on the shaft 70 to operating positions as shown in Fig. 2, and a retracting cable 76 is attached to the oposite arm 73 of the cross head. The cables 74 and 76 extend rearwardly over the multi-pulleys 19, and thence to the control station of the tractor for alternate use in swinging the frame and cutters into and out of operating positions. By a pull on cable 74 the cutters are swung downwardly and inwardly to the position shown in Figure 2 for cutting the standing cane ahead of the cutters 43, in order to prevent pulling the cane up by the roots by the tines 35 as the forks move upwardly to dump the cane, and after the cutting operation the frame and the cutter 69 are returned to the position shown in Figure 1. As the cutters 69 move downwardly a shield 69a packs the cut cane against the forks 35.

After retraction of the cutter 69 to positions of Figs. 1 and 4, the crane may be swung laterally to the dumping position, by turning the crane on the tractor, and by pulling on the cable 60 the rack is projected forwardly to eject the trimmed bundle of cane and dump or discharge the bundle into a waiting truck for hauling to the factory.

For disposal of the trash from the cane, the gathering forks may be equipped with suitable flame throwers or torches as 78, and the frame for the second cutter 69 may also be equipped with a torch or burner 79, and these burners may be controlled by suitable means as desired, to burn the leaves, and tassels and clean the sugar cane, before the start of, or during the harvesting and loading operations.

As the harvester advances over the field of cane, these described operations are successively repeated, and the machine is automatically adapted, by the pilot truck, for operating under varying conditions encountered in the surface of the field, or ground surface. As the harvesting mechanism approaches a hill or a furrow in an undulating surface, and the front ends of the tines of the gathering fork tend to touch the ground surface, the wheels of the pilot truck in ascending the hill, and through the instrumentality of the linkage between the truck and the fork arms, lift the gathering fork free from the ground surface, thus automatically positioning the cutter 43 for continuous and constant service in cutting the cane near its roots.

Having thus fully described my invention, what I claim as new and desire to secure by Letters Patent is:

1. In a sugar cane harvester including a tractor having a swiveled suspending crane, a beam carried by the crane, and a carriage reciprocable on the beam, the combination with a carrier frame rigid with the carriage, and a gathering fork pivotally mounted on the carrier frame, of a wheeled pilot-truck pivotally suspended from the carrier frame, and flexible connections between the truck and the gathering fork, for the purpose described.

2. In the sugar cane harvester described, the combination with a supporting beam forming a track, a reciprocable carriage on the track, and a carrier frame rigid with the carriage, of a horizontally disposed gathering fork pivotally suspended on the carrier frame and rearwardly extending arms on the fork, a cutter flexibly mounted beneath the fork, a wheeled pilot-truck pivotally suspended from the carrier frame beneath the fork, and linkage connecting the fork arms with the rear end of the pilot truck.

3. In a pilot-truck assembly for the harvester described, the combination with a gathering fork having rearwardly extending arms, a cutter suspended from the fork, and a pivotal support for the fork, of a wheeled pilot-truck pivotally mounted beneath the fork, and linkage connecting the rear end of the truck with the fork arms for the purpose described.

4. The combination with a supporting beam forming a track, a reciprocable carriage on the track, and a U-shaped carrier frame rigid with the carriage, of a horizontally disposed gathering fork having a pivotal axis in the frame, a cane cutter mounted beneath the fork, a wheeled pilot truck pivotally supported beneath the fork and flexibly connected therewith, and an upwardly extending cane rack pivotally mounted on said pivotal axis.

5. In harvesting mechanism as described, the combination with a pivotally mounted gathering fork, a pivotally mounted and wheeled pilot-truck mounted beneath the rear end of the fork, and linkage connecting the rear end of the truck with the rear end of the fork, of a draw bar pivotally mounted beneath the front of the fork, a supporting yoke having a swivel joint with the rear end of the draw bar, and a horizontally disposed cutter pivotally mounted in the yoke.

6. In a sugar cane harvester as described, the combination with a supporting beam forming a track, a reciprocable carriage on the track, and a carrier frame rigid with the carriage, of harvesting mechanism pivotally mounted on the frame and a pivotally mounted rack to receive the harvested cane, a cutter frame pivotally mounted on the beam and operating means therefor, and cutting mechanism mounted on the cutter frame for trimming the cane on the rack.

7. In a sugar cane harvester as described, the combination with a supporting beam, a reciprocable carriage on the beam, and a carrier frame rigid with the carriage, of harvesting mechanism pivotally mounted on the frame, a rack pivotally mounted on the frame for receiving the cane, a cutter frame pivotally mounted on the beam and a cutter mounted on this frame, a cross head rigid with the cutter frame, and cable connections for the cross head adapted to vary the position of the cutter and its frame.

8. In the harvesting mechanism described, the combination with pivotally mounted gathering forks and their pivotally mounted and wheeled pilot trucks, of draw bars hinged to the forks, motor casings pivotally mounted on the rear ends of the draw bars and cutter bars rigid with the casings, reciprocable cutter knives mounted in the casings for coaction with the cutter bars, motors mounted in the casings, and power transmission mechanism for translating the rotary motion of the motors into reciprocating motion of the knives.

9. The combination with a carrier frame, gathering forks pivotally suspended therein, and rearwardly extending slotted arms on the forks, of cutters flexibly connected with the front portions of the forks, wheeled pilot trucks located beneath the fork arms, and pivotal supports for the trucks on the carrier frame, and linkage pivotally connecting the rear ends of the trucks with the slotted arms of the forks.

10. In a sugar cane harvester, the combination which comprises, a crane having a boom and a plurality of actuating cables extended therefrom, a beam carried by the boom, a carriage mounted to travel on the beam, a plurality of substantially horizontally positioned cane gripping forks suspended from the carriage, a plurality of cutters carried by the forks, a second set of cutters carried by the said beam for cutting standing cane ahead of the cutters carried by the forks, means elevating the cutters and forks by the cables, and means controlling the elevation of the cutters in relation to the ground over which the harvester is traveling.

11. The invention as in claim 2 wherein the sugar cane harvester includes a tractor having a swiveled suspension crane and a boom having a horizontal axis on the crane, and said supporting beam is carried by the boom, means for retaining the carriage on the beam and variable supporting means for the carriage connecting the carriage with the boom.

12. The invention as in claim 2 wherein the carriage is provided with rollers for retaining the carriage in operative position on the track, a supporting pulley on the carriage and a supporting pulley on the boom, and a supporting cable for the carriage looped about said pulleys.

13. The invention as in claim 2, wherein said sugar cane harvester comprises a crane having a boom and a plurality of actuating cables extending therefrom and means is provided for elevating the cutter and fork by the cables.

14. The invention as in claim 2 wherein said sugar cane harvester comprises a crane having a boom and a plurality of actuating cables extending therefrom, means for elevating the cutter and fork by the cables and means controlling the elevation of the cutter in relation to the ground over which the harvester is traveling.

TAKEO MIYAGI.

REFERENCES CITED

The following references are of record in the file of this patent:

UNITED STATES PATENTS

| Number | Name | Date |
| --- | --- | --- |
| 683,775 | Kirkpatrick | Oct. 1, 1901 |
| 898,501 | Pederson | Sept. 15, 1908 |
| 1,283,073 | Carey | Oct. 29, 1918 |